United States Patent [19]

Marsh

[11] 3,727,839
[45] Apr. 17, 1973

[54] AGGLOMERATING POWDERED PRODUCTS

[75] Inventor: William Cornelius Marsh, Marysville, Ohio

[73] Assignee: Societe D'Assistance Technique Pour Produits Nestle S.A., Lausanne, Switzerland

[22] Filed: Sept. 21, 1971

[21] Appl. No.: 182,357

Related U.S. Application Data

[62] Division of Ser. No. 835,173, June 20, 1969, Pat. No. 3,622,081.

[52] U.S. Cl. ................................................. 239/8
[51] Int. Cl. ........................... A01n 17/02, A62c 1/12
[58] Field of Search ........................ 239/1, 8, 9, 10

[56] References Cited

UNITED STATES PATENTS 2,392,408  1/1946  Radonich ........................... 239/1
3,423,028  1/1969  Stupakis ............................ 239/8
3,615,051  10/1971 Gettig et al. ...................... 239/8

Primary Examiner—Lloyd L. King
Attorney—Elmer R. Helferich et al.

[57] ABSTRACT

A process for agglomerating powdered materials in which the materials are discharged from the aperture of a conduit while simultaneously a stream of an aqueous medium is discharged codirectionally with the particulate material and in a course encircling the aperture with a second aqueous stream being discharged in an encircling course around the particulate material stream within the conduit at a location upstream of the aperture. A nozzle for agglomerating powdered materials, especially food products, which comprises at least two annular steam inlets into a central duct through which the material is passed also is disclosed. Other features of the invention appear in the specification and drawings.

2 Claims, 2 Drawing Figures

3,727,839

AGGLOMERATING POWDERED PRODUCTS

CROSS-REFERENCE TO RELATED APPLICATION

This application is a division of pending application Ser. No. 835,173 filed June 20, 1969, now U.S. Pat. No. 3,622,081.

The present invention is concerned with agglomerating powdered products and a nozzle for agglomerating powdered products.

The effect of agglomerating a powder is to improve its reconstitution properties, by increasing the average particle size, notably by eliminating the smallest particle fraction known as the "fines."

A high percentage of fines is especially undesirable with food products such as instant tea or coffee which are packed in transparent containers, as the fines tend to stick to the inside walls and give the impression that all the material in the container is a fine powder. This considerably reduces the consumer appeal of the product.

It is also frequently desirable to increase the average particle size of the powder in order to regulate the density, color and other physical properties of the product, such as wettability.

Agglomeration of powdered materials generally comprises two principal stages. The first of these is wetting, in which the particle surfaces are rendered sticky by the application of moisture and the second is an after-drying in which excess moisture is removed. During and/or after wetting the particles are generally maintained under turbulent conditions to promote contacts and sticking. The moisture may be applied as finely atomized water or as steam, in the latter case it being advantageous to cool the particles in order to facilitate condensation. The wetting of the particles may be effected in various ways, for example by feeding the particles through an appropriately-shaped nozzle simultaneously with steam. The throughput of such a nozzle, in terms of powder, needs to be regulated to assure wetting of substantially all the particles which are fed therethrough while avoiding sticking of the material to the nozzle itself.

An object of the present invention is to provide an improved agglomerating process and an agglomerating nozzle capable of handling large quantities of powdered product while assuring efficient wetting of the particles and providing turbulent conditions to promote inter-particle contacts.

The process according to the present invention comprises discharging a stream of particulate material from an aperture at the end of a conduit through which the particulate material is fed while simultaneously a first stream of an aqueous medium is discharged codirectionally with the particulate material flow in a course encircling the aperture and at a location adjacent the aperture, and discharging a second aqueous stream in an encircling course around the stream of particulate material while it is within the conduit and at a location upstream of the aperture, said second stream being directed codirectionally with the particulate material flow.

The nozzle according to the present invention comprises, in combination a. a housing having an upper opening and a lower opening, a gas chamber within said housing and an inlet port communicating with the gas chamber; and b. at least two sleeves mounted concentrically within the housing and defining a downwardly and outwardly flaring central duct providing an open passage through the housing between the upper and lower openings, the sleeves being arranged to provide a first conduit of annular cross-section terminating in an opening adjacent the lower opening of the housing and at least one further annular conduit concentric with said first conduit and terminating in an opening within the duct, each of said conduits being in communication with the gas chamber.

The nozzle may comprise any desired number of sleeves, for example three to six, but five has been found to be sufficient for a highly satisfactory agglomeration.

Figure 1:
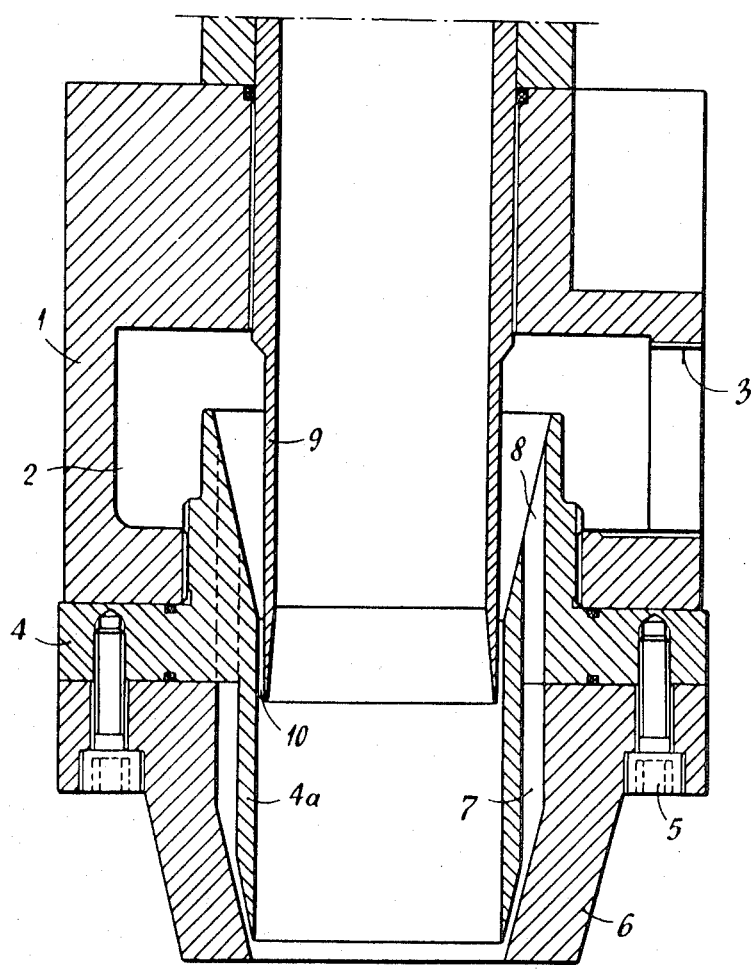
FIG. 1 is a longitudinal section of a nozzle comprising two sleeves.

The housing of the nozzle shown in FIG. 1 is in three parts. The upper part is a casing 1 enclosing a chamber 2 into which gas or vapor can be admitted through the inlet port 3. The port 3 is of circular cross-section and may be internally threaded to receive a steam supply pipe.

The central annular part 4 of the housing is screwed into the casing 1, projecting upwardly into the chamber 2, and has a sleeve 4a extending downwardly. The lower end of sleeve 4a is tapered. Bolted to the central part 4 by bolts 5 is the third part of the housing, a cap 6 having a central opening surrounding the sleeve 4a. An annular conduit 7 is thus provided between the outside of the sleeve 4a and the inner surface of the cap 6. The chamber 2 and the conduit 7 are in communication with each other by means of longitudinal channels 8 bored through the central part 4.

A tube 9 passes through the chamber 2 and extends into the sleeve 4a thus providing an annular conduit 10 communicating with the chamber 2.

In operation, the nozzle is generally mounted vertically above a drying or agglomeration chamber. The powder to be agglomerated according to the present invention is fed, for example, from a hopper under gravity into the pipe 9. Steam, which has preferably been saturated and desuperheated is fed to the chamber 2 through the port 3 and is expelled into the duct through the conduits 7 and 10 where it contacts the powder. By reason of the inward taper of the lower end of conduit 7 turbulence is generated at the exit of the nozzle, thus promoting contacts among the particles.

It has been found that, compared with known processes and simple nozzles in which a singe jet of steam is directed into a falling stream of powder, the process and nozzle according to the present invention can agglomerate a considerably larger amount of powder in a given time without the formation of undesirable lumps in the product and with a relatively low consumption of steam. It is believed that the use of a plurality of annular jets gives increased turbulence in the stream of powder and hence an increased collision rate between the particles without a large increase of pressure within the nozzle. Furthermore, the jets of steam which emerge obliquely from the openings with respect to the inner surface of the nozzle prevent powder from sticking inside the nozzle. As the steam is impelled in about the same direction as the powder, the total contact time between the steam and powder is relatively long and hence efficient wetting is achieved. In addition, by providing multiple steam jets within the nozzle a longer contact time is provided between the powder and steam which raises the product temperature and thus promotes fusion of the particles, giving a stronger bond.

Figure 2:
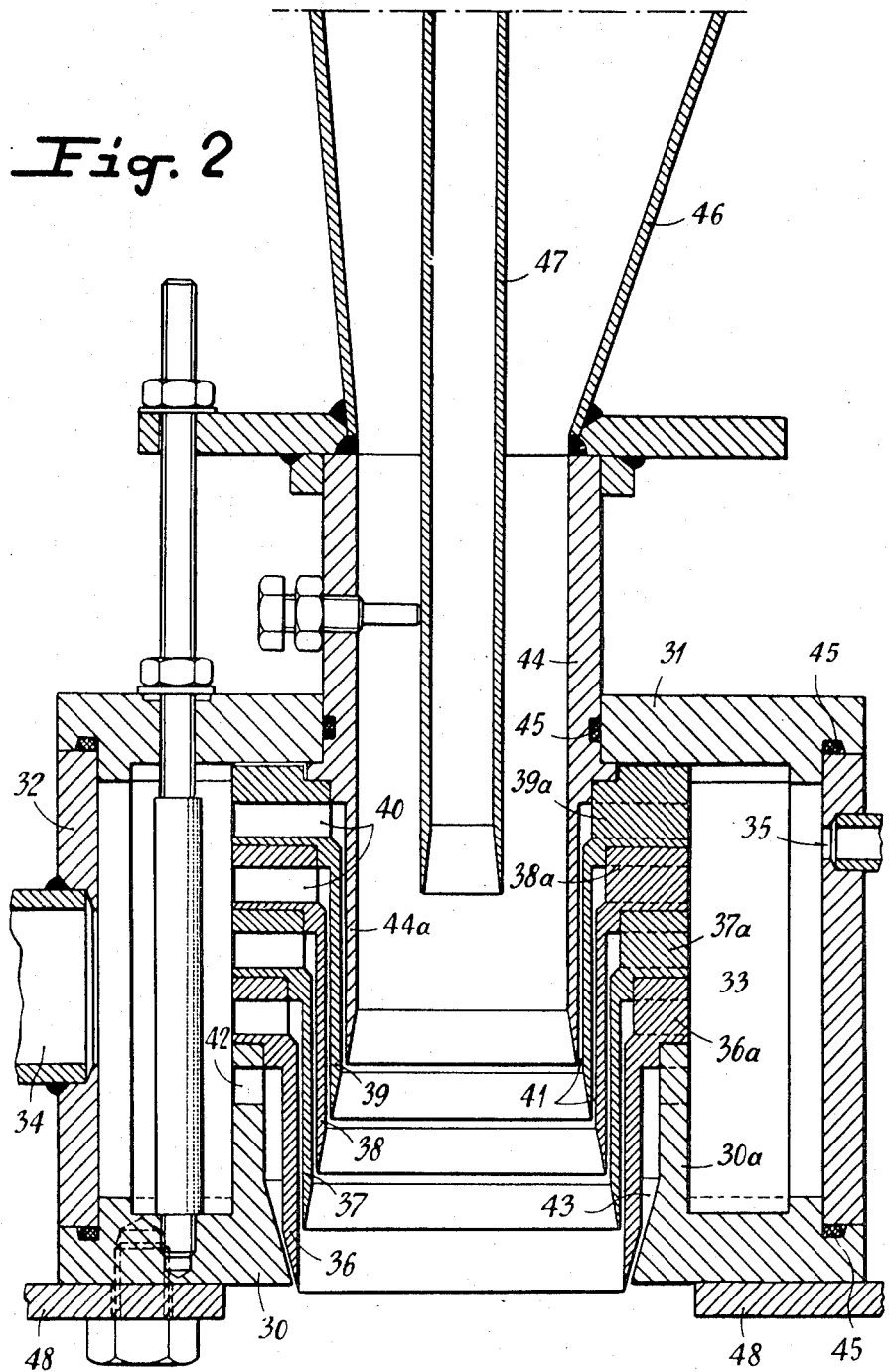
FIG. 2 is a like section of a five-sleeve nozzle.

In the nozzle shown in FIG. 2, the housing assembly is made up of a base plate 30 having a central opening, a cover 31 and a casing 32 enclosing an annular chamber 33, the assembly being bolted together. Ports 34 and 35 are provided in the casing, port 34 being a steam inlet and port 35 for connecting a pressure gauge. An annular flange 30a is provided on the inside of the base plate 30 for supporting four sleeves 36, 37, 38 and 39. Each sleeve has an annular collar 36a, 37a, 38a, 39a in which a series of holes 40 is bored, providing passages between the chamber 33 and the concentric annular channels 41. The sleeves are stacked concentrically, with the collars resting on each other, the collar 36a of the lowest sleeve 36 resting on the flange 30a. The internal wall or diffuser at the end of sleeve 37, 38 and 39 is bevelled, flaring outwardly. Holes 42 are bored in the flange 30a to provide a passage between said chamber and the annular channel 43 defined by the inwardly tapered outside surface of the lowermost sleeve 36 and the tapered inside surface of the central opening of the base plate. A tube 44 extends into the housing through an opening in the cover 31 and a gas-tight seal between the tube and the cover is obtained by a suitable sealing member 45 such as an O-ring seal. The lower part of the tube 44 is a sleeve 44a extending into the upper sleeve 39, and the lower end is bevelled on the inside. A hopper 46 is mounted above and in communication with the tube 44, and a steam jet 47 is mounted within the hopper and extends concentrically with the tube 44 into the sleeve 44a. The nozzle assembly is bolted to a frame 48 mounted above a drying or agglomeration chamber.

The operation of the nozzle shown in FIG. 2 is similar to that of the first embodiment having two sleeves, except that steam is fed to the falling powder at five points at the lower extremities of the sleeves as well as through the jet 47.

The spacing between the sleeves may be chosen as desired in relation to the material being treated. Likewise, the lowermost sleeve may project beyond the opening in the base plate, as in FIG. 2, or it may be recessed, as shown in FIG. 1. It may also be flush with the opening. Furthermore, the bevelling of the sleeve openings may be varied to provide different steam flow patterns.

Alternatively, the lower ends of the sleeves may be turned inwardly. In this arrangement each intermediate sleeve has a cylindrical body with, at its upper end, a collar similar to the collars 36a, 37a, 38a, 39a, but its lower end is tapered inwardly without being bevelled. As before, the channels formed between the sleeves open into an outwardly-flaring duct, and the width of the opening between the lower ends of adjacent sleeves may be varied by inserting annular spacers of different thicknesses between the collars.

The process and nozzle according to the present invention may be used for agglomerating various powdered materials, expecially food products. It is particularly suitable for agglomerating coffee and tea extracts, powdered beverage compositions containing, for example, sugar, cocoa, and optionally milk solids, flour-based soup and sauce mixes and like products.

I claim:

1. Process for agglomerating particulate material comprising discharging a stream of said particulate material from an aperture at the end of a conduit through which the particulate material is fed, while simultaneously
   a. discharging a stream of an aqueous medium at a location adjacent said aperture and in a course encircling said aperture with said stream tapering radially inwardly in its flow course exteriorly of said aperture to converge with said stream of particulate material thereby to create turbulence in the particulate material stream as it discharges from said aperture, and
   b. discharging at least one other aqueous stream in an encircling course around the stream of particulate material while it is within said conduit and codirectionally therewith at a location upstream of said aperture to create turbulence in the particulate material stream within said conduit.

2. Process according to claim 1 in which the aqueous medium is steam.

* * * * *